US009501785B2

(12) United States Patent
Dewan et al.

(10) Patent No.: US 9,501,785 B2
(45) Date of Patent: Nov. 22, 2016

(54) USING FEEDBACK REPORTS TO DETERMINE PERFORMANCE OF AN APPLICATION IN A GEOGRAPHIC LOCATION

(75) Inventors: Rajat Dewan, Mountain View, CA (US); Michal Kaczmarek, Waedenswil (CH); Joanna K. Chwastowska, Tarnow (PL); Adrian D. Zakrzewski, Warsaw (PL); Jacek Surazski, Cracow (PL)

(73) Assignee: Google Inc., Mountain View, CA (US)

( * ) Notice: Subject to any disclaimer, the term of this patent is extended or adjusted under 35 U.S.C. 154(b) by 796 days.

(21) Appl. No.: 13/147,241

(22) PCT Filed: Apr. 28, 2011

(86) PCT No.: PCT/PL2011/000045
§ 371 (c)(1),
(2), (4) Date: Aug. 1, 2011

(87) PCT Pub. No.: WO2012/148293
PCT Pub. Date: Nov. 1, 2012

(65) Prior Publication Data
US 2012/0278194 A1    Nov. 1, 2012

(51) Int. Cl.
*G06Q 30/00* (2012.01)
*G06Q 30/02* (2012.01)
*G06F 11/07* (2006.01)

(52) U.S. Cl.
CPC ....... *G06Q 30/0261* (2013.01); *G06F 11/0742* (2013.01); *G06F 11/0784* (2013.01); *G06Q 30/02* (2013.01); *G06Q 30/0205* (2013.01); *G06Q 30/0269* (2013.01)

(58) Field of Classification Search
CPC ............. G06Q 30/0261; G06Q 30/02; G06Q 30/0205; G06Q 30/0269; G06F 11/0742; G06F 11/0784

USPC .................................................. 705/26.1, 27.1
See application file for complete search history.

(56) References Cited

U.S. PATENT DOCUMENTS

| | | | |
|---|---|---|---|
| 8,010,628 B2* | 8/2011 | Finlaw | 709/218 |
| 8,214,264 B2* | 7/2012 | Kasavin et al. | 705/26.7 |
| 8,452,797 B1* | 5/2013 | Paleja et al. | 707/767 |
| 9,092,947 B1* | 7/2015 | Strand | H04W 4/021 |

(Continued)

OTHER PUBLICATIONS

"Exploring the Design Space of Context-aware Recommender Systems that Suggest Mobile Applications," by Matthias Bohmer, Gernot Bauer, and Antonio Kruger, CARS-210, Sep. 26, 2010.*

(Continued)

*Primary Examiner* — Anne Georgalas
(74) *Attorney, Agent, or Firm* — Morris & Kamlay LLP

(57) ABSTRACT

Methods, systems, and apparatus, including computer programs encoded on a computer storage medium, for ranking applications. In one aspect, a method includes receiving, from a computing device, a feedback report related to an application configured to run on the computing device, the feedback report including information indicative of an error with the application, and a geographic location of the computing device at a time when the application encountered the error; generating, based on the feedback report, one or more metrics indicative of a performance of the application in the geographic location; retrieving information indicative of other applications associated with metrics indicative of a performance of the other applications in the geographic location; and ranking the applications in accordance with the metrics indicative of the performance of the applications in the geographic location.

14 Claims, 4 Drawing Sheets

(56) References Cited

U.S. PATENT DOCUMENTS

2001/0049263 A1* 12/2001 Zhang .......................... 455/67.1
2007/0233782 A1* 10/2007 Tali ............................... 709/203
2008/0263024 A1* 10/2008 Landschaft ......... G06F 17/3087
2009/0182533 A1    7/2009 Neuenschwander et al.
2011/0320307 A1* 12/2011 Mehta et al. ................ 705/26.7

OTHER PUBLICATIONS

Matthias Böhmer et al., "Exploring the Design Space of Context-aware Recommender Systems that Suggest Mobile Applications," *CARS-2010*, Sep. 26, 2010.

Bilgehan Erman et al., "Mobile Applications Discovery: A Subscriber-Centric Approach," *Bell Labs Technical Journal* 15(4), pp. 135-148, 2011.

Wolfgang Woerndl et al., "A Hybrid Recommender System for context-aware Recommendations of Mobile Applications," pp. 871-878, Apr. 1, 2007.

Bo Yan et al., "AppJoy: personalized Mobile Application Discovery," *MobiSys '11*, Jun. 28-Jul. 1, 2011.

PCT Notification of Transmittal of International Search Report and Written Opinion of the International Searching Authority for corresponding International application No. PCT/PL2011/000045, dated Aug. 29, 2011.

* cited by examiner

USING FEEDBACK REPORTS TO DETERMINE PERFORMANCE OF AN APPLICATION IN A GEOGRAPHIC LOCATION

This application is a national stage entry of PCT Application No. PCT/PL2011/000045, filed Apr. 28, 2011, the disclosure of which is incorporated by reference in its entirety.

BACKGROUND

Computing devices such as smart phones may be configured to run applications. Generally, an application is software that runs on the resources of the computing device. A user of the computing device may encounter an error in the application, for example, while the computing device is running the application.

The application may include a link to a web page, to allow the user to report an error to a developer of the application. The user may enter information specifying a type of error encountered, by interacting with controls or fields included on the web page. The web page may in turn send the information to a server system that is configured to collect information indicative of errors encountered by user of the application.

SUMMARY

In general, one aspect of the subject matter described in this specification may be embodied in methods that include the actions of receiving, from a computing device, a feedback report related to an application configured to run on the computing device, the feedback report including information indicative of an error with the application, and a geographic location of the computing device at a time when the application encountered the error; generating, based on the feedback report, one or more metrics indicative of a performance of the application in the geographic location; retrieving information indicative of other applications associated with metrics indicative of a performance of the other applications in the geographic location; and ranking the applications in accordance with the metrics indicative of the performance of the applications in the geographic location.

Implementations of the disclosure may include one or more of the following features. In some implementations, the method also includes parsing the feedback report to determine information indicative of a name of the application, the information indicative of the error with the application, and the information indicative of the geographic location; and storing in a database the information indicative of the name of the application, the information indicative of the error with the application, and the information indicative of the geographic location, with one or more pointers linking each of the information indicative of the name of the application, the information indicative of the error, and the information indicative of the geographic location.

In other implementations, the received feedback report includes a first feedback report, and the method further includes: retrieving one or more second feedback reports, the one or more second feedback reports including one or more attributes of one or more applications; receiving a request for an application associated with one or more criteria; determining, based on the one or more second feedback reports, a plurality of applications associated with attributes that match the one or more criteria; and ranking the plurality of applications based on (i) a relevance of each of the plurality of applications to the one or more criteria, and (ii) metrics indicative of a performance of each of the plurality of applications in the geographic location. The method may also include generating a graphical user interface that when rendered on a display device renders a visual representation of the ranked applications.

In still other implementations, the feedback report is (i) generated by a feedback application configured to run on the computing device, and (ii) periodically received from the computing device of the user. In some implementations, the method includes receiving a request to purchase at least one of the ranked applications; and sending an application associated with the request to the computing device.

In another aspect of the disclosure, one or more machine-readable media are configured to store instructions that are executable by one or more processing devices to perform operations including receiving, from a computing device, a feedback report related to an application configured to run on the computing device, the feedback report including information indicative of an error with the application, and a geographic location of the computing device at a time when the application encountered the error; generating, based on the feedback report, one or more metrics indicative of a performance of the application in the geographic location; retrieving information indicative of other applications associated with metrics indicative of a performance of the other applications in the geographic location; and ranking the applications in accordance with the metrics indicative of the performance of the applications in the geographic location.

Implementations of this aspect of the present disclosure may include one or more of the foregoing features.

In still another aspect of the disclosure, an electronic system includes one or more processing devices; and one or more machine-readable media configured to store instructions that are executable by the one or more processing devices to perform operations including: receiving, from a computing device, a feedback report related to an application configured to run on the computing device, the feedback report including information indicative of an error with the application, and a geographic location of the computing device at a time when the application encountered the error; generating, based on the feedback report, one or more metrics indicative of a performance of the application in the geographic location; retrieving information indicative of other applications associated with metrics indicative of a performance of the other applications in the geographic location; and ranking the applications in accordance with the metrics indicative of the performance of the applications in the geographic location Implementations of this aspect of the present disclosure may include one or more of the foregoing features.

In yet another aspect of the disclosure an electronic system includes means for receiving, from a computing device, a feedback report related to an application configured to run on the computing device, the feedback report including information indicative of an error with the application, and a geographic location of the computing device at a time when the application encountered the error; generating, based on the feedback report, one or more metrics indicative of a performance of the application in the geographic location; retrieving information indicative of other applications associated with metrics indicative of a performance of the other applications in the geographic location; and ranking the applications in accordance with the metrics indicative of the performance of the applications in the geographic location Implementations of this aspect of the present disclosure may include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
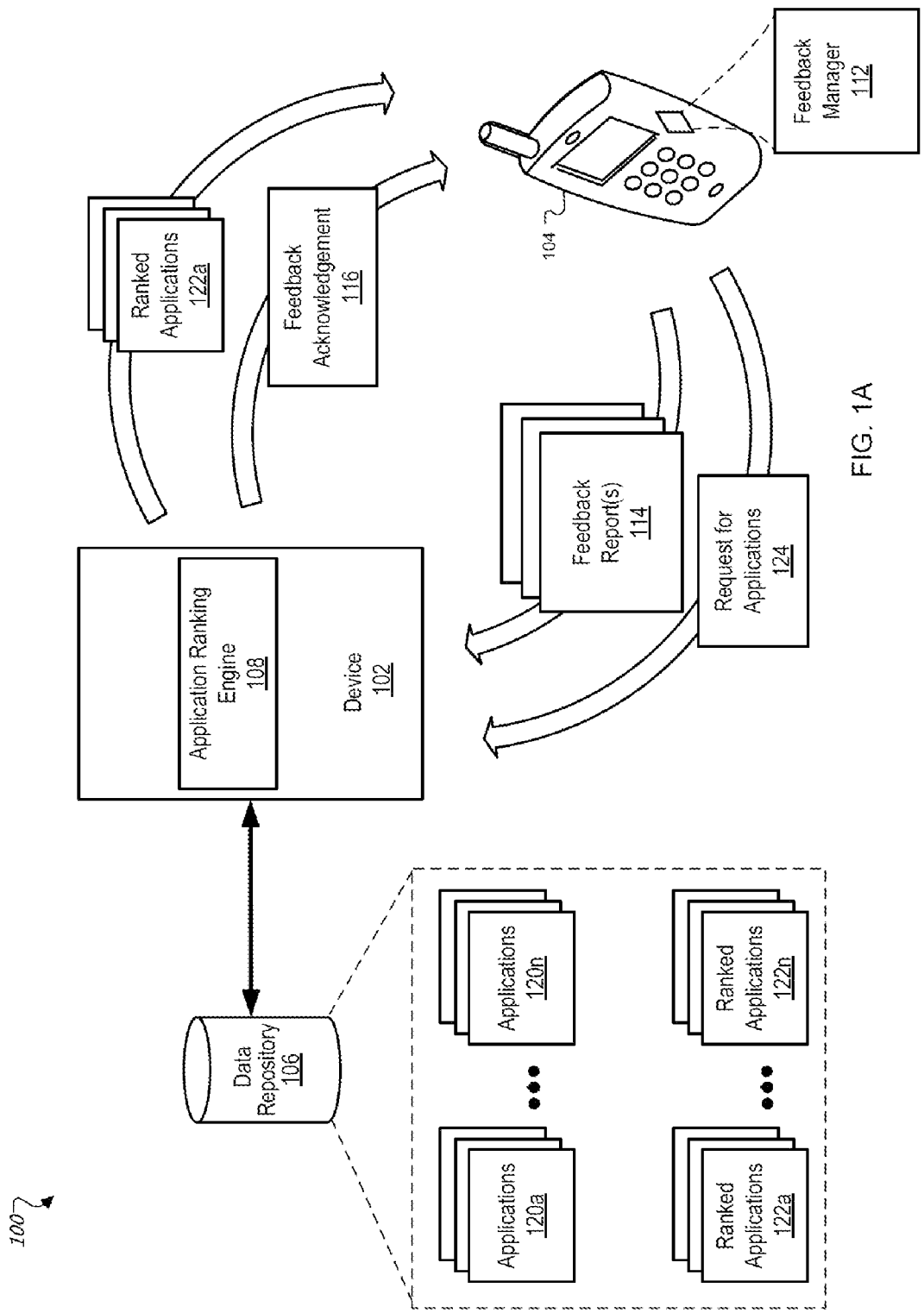
FIG. 1A is a block diagram of an example system in which a ranking device uses feedback reports to rank applications.

FIG. 1A is a block diagram of example system 100 in which a ranking device 102 uses feedback reports 114 to rank applications 120a-120n. Device 102 includes application ranking engine 108. Application ranking engine 108 is configured to rank applications 120a-120n, for example, based on feedback reports 114.

In general, the device 102 receives feedback reports 114 from applications that are running on a mobile client communication device ("user device") 104. A feedback report includes information associated with an application. In an example, a feedback report includes information indicative of a type of error that occurred in the application. In an example, types of errors include a failure of the application to start, a failure of the application to send data to an external system, a "crash" of the application, a failure of the application to display information in a pre-defined format, and so forth.

In another example, a feedback report is initiated by a user of a user device and includes user comments and feedback for the application. The feedback report also includes information indicative of attributes of the application and/or of the computing device upon occurrence of the error, including, geographic location attributes, time attributes, computing device type attributes, each of which are described in further detail below.

Generally, an attribute includes a characteristic and/or a quality of the application and/or of the computing device. For example, a geographic location attribute includes information specifying a geographic location of the computing device during the occurrence of the error with the application. A time attribute includes a timestamp generated by the computing device during the occurrence of the error. A computing device type attribute includes information specifying a type of computing device that was running the application during the occurrence of the error.

The device 102 collects the feedback reports 114 and stores the feedback reports 114, e.g., based on the name of the application that encountered the error. Developers of applications may use the feedback reports 114 to improve the applications. The device 102 may also use the feedback reports to generate various metrics indicative of a level of performance of the applications, including, e.g., quality metrics and usage metrics, each of which are described in further detail below.

Generally, a quality metric includes information specifying a measure of quality of an application in a particular geographic location. For example, the quality metric may indicate whether an application is performing above or below a threshold quality metric. A threshold quality metric includes information specifying a pre-defined level of quality to be obtained by an application for a performance of the application to be acceptable, e.g., as determined by the device 102.

In another example, the quality metric may indicate how one application is performing relative to another application. In still another example, the quality metric may indicate how an application is performing relative to a pre-defined standard, e.g., a pre-defined scale of values (e.g., a 1-10 scale). The device 102 uses the quality metrics to rank applications based on the quality of applications relative to each other, including, e.g., applications with higher quality metrics are ranked above applications with lower quality metrics.

In still another example, the device 102 uses the feedback reports 114 to generate usage metrics. Generally, a usage metric includes information specifying a number of computing devices that are running an application in a particular geographic location. The device 102 may use the usage metrics to determine applications that are popular for the particular geographic location, for example, by determining when a number of users using the application (e.g., as indicated by the usage metrics) in the particular geographic location exceeds a threshold usage metric. A threshold usage metric includes information specifying a pre-defined level of use to be obtained by an application for the device 102 to assess the application as having a characteristic associated with usage, e.g., popularity of the application.

For example, the device 102 may return to the user a list of applications that are popular in San Francisco, Calif., by determining a number of applications associated with usage metrics that exceed the threshold usage metric. In another example, the device 102 uses the usage metrics to rank the applications, including, e.g., ranking applications with higher usage metrics above applications with lower usage metrics.

In an example, an online vendor may display applications that are available for purchase. In this example, a consumer may send to the online vendor a request for applications associated with various criteria, including, e.g., applications that perform well in a particular geographic location, applications that are popular in the particular geographic location, and so forth. Using the metrics to rank the applications, the online vendor may increase the relevancy of the applications that are sent to the consumer in response to the request.

In an example, the device 102 generates a graphical user interface that when rendered on a display device renders a visual representation of the applications that are ranked based on a performance of the applications in a particular geographic location. The graphical user interface may be displayed in an online store or in an application, e.g., through which other applications may be purchased. In this example, a consumer may purchase and/or download an application based on a performance of the application, e.g., as indicated by the ranking of the application relative to other applications.

Figure 1B:
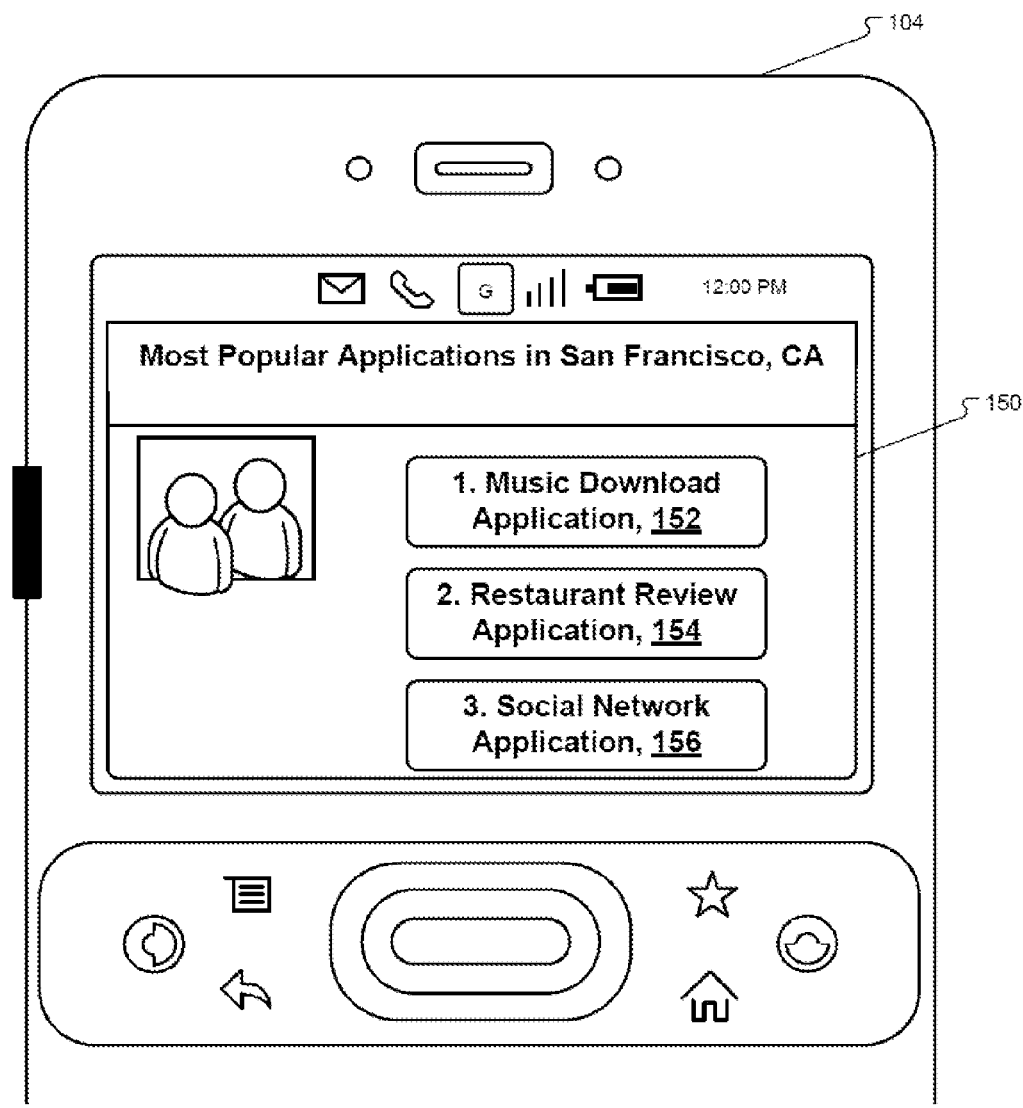
FIG. 1B is an example of ranked applications displayed in a graphical user interface on a user device.

Referring to FIG. 1B, device 102 generates graphical user interface 150 that is displayed on a screen of user device 104. In this example, graphical user interface 150 renders a visual representation of applications 152, 154, 156 that are ranked based on a performance of the applications in a particular geographic location, namely, San Francisco, Calif. In the illustrative example of FIG. 1B, device 102 ranks applications 152, 154, 156 based on feedback reports received for these applications.

In an example, the ranking of the applications may be updated, as the device 102 receives additional feedback reports and generates updated performance metrics based on the additional feedback reports. As the device 102 updates the ranking of the applications, the graphical user interface is also updated with the updated ranking of the applications.

For example, the consumer may send a request to the online vendor for applications that are popular in San Francisco, Calif. The online vendor may display for the consumer a listing of applications associated with high usage metrics in San Francisco, Calif. relative to the usage metrics of other applications being used in San Francisco, Calif. In this example, the consumer may send to the device 102 a request to purchase an application that is associated with a highest usage metric, e.g., relative to the usage metrics of the other applications that are available for purchase.

Device 102 may be any of a variety of computing devices capable of receiving information, such as a server, a distributed computing system, a desktop computer, a laptop, a cell phone, a rack-mounted server, and so forth. Device 102 may be a single system or a group of systems that are at a same location or at different locations.

Device 102 may also include a processing device with one or more microprocessors. Generally, the processing device may include any appropriate processor and/or logic that is capable of receiving and storing data, and of communicating over a network. Device 102 may also include memory that may include a hard drive and a random access memory storage device, such as a dynamic random access memory, or other types of non-transitory machine-readable storage devices. The memory stores computer programs that are executable by the processing device. These computer programs include application ranking engine 108. A bus system, including, for example, a data bus and a motherboard, may be used to establish and to control data communication between the components of device 102.

The user device 104 is an electronic device that is under control of a user and is capable of sending data to and receiving data from device 102, e.g., over the network. User device 104 may include a personal computer, a mobile communication device, and other devices that may send and receive data over a network. User device 104 typically includes applications, e.g., a web browser, an email application, a music application, to facilitate the sending and the receiving of data.

Device 102 may receive information from user device 104 via input/output ("I/O") interface. The I/O interface may be any type of interface capable of receiving information over a network, such as an Ethernet interface, a wireless networking interface, a fiber-optic networking interface, a modem, and so forth.

Example system 100 also includes data repository 106. Data repository 106 is configured to store applications 120a-120n, for example, that may be purchased and/or accessed by a user of user device 104. In an example, application ranking engine 108 is configured to use feedback reports 114 received from user device 104 (and/or from numerous, different user devices) to generate metrics, including, e.g., quality metrics, usage metrics, and so forth.

Using the generated metrics, application ranking engine 108 is further configured to rank applications 120a-120n stored in data repository 106, for example, based on various criteria, including, e.g., most popular applications for a particular geographic location (e.g., applications with usage metrics above the threshold usage metric), applications that perform well in the particular geographic location (e.g., applications with quality metrics above the threshold quality metric), and so forth. In the illustrative example of FIG. 1A, the ranked applications include ranked applications 122a-122n.

In the illustrative example of FIG. 1A, user device 104 includes feedback manager 112, which is configured to generate feedback reports 114 for applications that are running on user device 104. In an example, an application running on user device 104 encounters an error that causes the application to shut down. In this example, feedback manager 112 generates feedback report 114 and sends feedback report 114 to device 102, as described in further detail below. In response, device 102 sends to user device 104 feedback acknowledgement 116. Feedback acknowledgement 116 includes information specifying that device 102 received feedback report 114.

Feedback manager 112 includes software that is configured to run independently from other applications that are running user device 104. In an example, feedback manager 112 is configured to generate feedback reports 114 for any of the numerous, different applications that are running on user device 104. When an application running on user device 104 encounters an error, feedback manager 112 receives information indicative of the error in numerous ways.

In an example, the application sends an error message including information indicative of the error to feedback manager 112. In another example, the application sends information indicative of the error to an error event manager (e.g., an event log) that is running on user device 104. In this example, feedback manager 112 is configured to scan the error event manager for information indicative of the error occurring in the application running on user device 104.

When feedback manager 112 detects information in the error event manager indicative of the error that occurred in the application and/or receives information indicative of the error, feedback manager 112 is configured to collect additional information for inclusion in feedback reports 114. In an example, feedback manager 112 sends to the application that encountered the error a request for the name of the application. Feedback manager 112 also collects information indicative of the type of error associated with the application, e.g., from the error event manager and/or from the error message received from the application.

Feedback manager 112 also collects a geographic location attribute of user device 104 when the error occurred. In particular, feedback manager 112 may determine the geographic location attribute of user device 104 from a Global Positioning System ("GPS") device embedded in user device 104. Other approaches or mechanisms may also be used to determine the geographic location, e.g., through dead reckoning, through manual user input, or through cell tower triangulation.

In another example, feedback manager 112 may collect the geographic location attribute from a device that is external to system 100, including, e.g., an external GPS system. In this example, feedback manager 112 is configured to generate a request for information specifying the geographic location of user device 104 at a particular point in time, namely, when feedback manager 112 detected the occurrence of the error in the application. Feedback manager 112 sends the request to the external GPS system.

In response, feedback manger 112 receives from the external GPS system information specifying the geographic location of user device 104 at the time when feedback manager 112 detected the occurrence of the error in the application. Using this information, feedback manager 112 sets a value of the geographic location attribute to be the geographic location of user device 104 at the time when feedback manager 112 detected the occurrence of the error in the application.

In another example, feedback report 114 includes information indicative of geographic coordinates (e.g., latitude and longitude coordinates) of user device 104 when feedback manager 112 detected the occurrence of the error in the application. In this example, application ranking engine 108 is configured to execute a reverse geocoding process to determine a common name of the geographic location associated with the geographic coordinates. In an example, the name of the geographic location includes, e.g., a name of a city, a name of a street, a name of a state, and so forth. Application ranking engine 108 sets a value of a geographic location attribute for feedback report 114 to equal the common name of the geographic location.

Feedback manager 112 is also configured to collect additional information from the application in which the error occurred, including, e.g., additional error messages generated by the application, a version number of the application, and user comments for the application.

Feedback manger 112 is also configured to collect additional information from user device 104, including, e.g., names of other applications that were running on user device 104 when the application encountered the error and/or generated a feedback report, an amount of system memory on user device 104 when the application encountered the error and/or generated a feedback report, a timestamp indicative of a time in which the error occurred (e.g., a time attribute) and/or the feedback report was generated, and information indicative of a state of an operation system running on user device 104 when the application encountered the error and/or generated the feedback report, as specified via kernel logs, application logs, and the like.

Following collection of the foregoing information and/or attributes, feedback manager 112 processes the information and generates feedback report 114 that includes some or all of the collected information and/or attributes. In an example, feedback report 114 includes information indicative of a name of an application associated with an error, a type of error generated by the application (e.g., an error code, an error message, and so forth), a time attribute, a geographic location attribute, and other information that feedback manager 112 collects from user device 104 and/or from the application that encountered the error.

In an example, feedback manager 112 is configured to send feedback reports 114 in real-time to device 102, e.g., as feedback report 114 is generated. In another example, feedback manager 112 is configured to store feedback reports 114 and to periodically send feedback reports 114 to device 102, e.g., at pre-defined time intervals.

Device 102 is configured to parse feedback reports 114 to determine a type of error associated with feedback reports 114 and attributes of feedback reports 114, including, e.g., geographic location attributes, time attributes, and so forth.

Data repository 106 stores feedback reports 114, associated attributes and information indicative of the type of error.

In an example, user device 104 is also configured to send request for applications 124 to device 102. Request for applications 124 is a request for applications that satisfy certain criteria, including, e.g., applications that are popular in a particular geographic location, applications that that perform well in the particular geographic location, and so forth.

Using the criteria included in request for applications 124, application ranking engine 108 determines one or more applications from applications 120-120n that satisfy the criteria. In particular, application ranking engine 108 is configured to determine applications associated with attributes and/or information matching at least some of the criteria, as described in further detail below. Application ranking engine 108 also generates ranked applications (e.g., ranked applications 122a-122n), by ranking the applications satisfying the criteria in an order of increasing relevance to the criteria included in the request. In the illustrative example of FIG. 1A, ranked applications 122a include applications satisfying the criteria included in request for applications 124. Application ranking engine 108 is configured to send to user device 104 ranked applications 122a.

Figure 2:
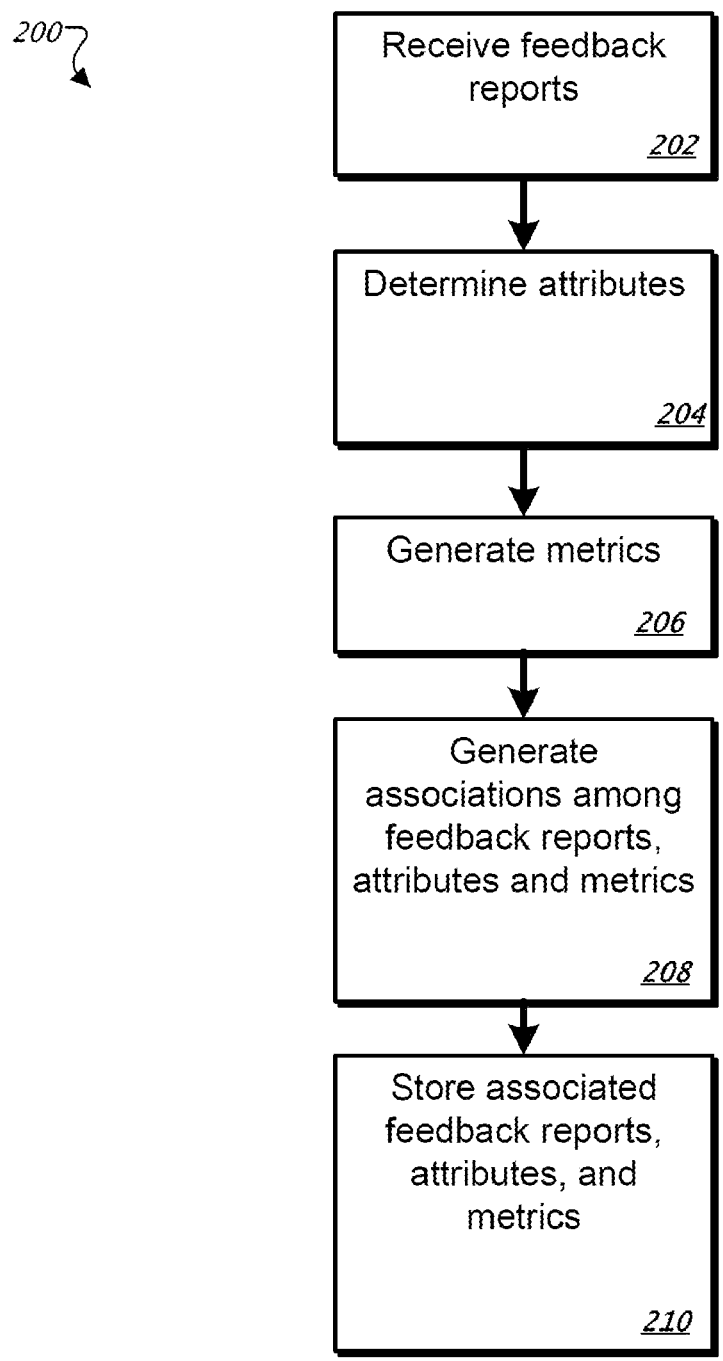
FIG. 2 is a flow diagram of an example process for storing feedback reports.

FIG. 2 is a flow diagram of an example process 200 for storing feedback reports 114. In operation, application ranking engine 108 receives (202) feedback reports 114. Application ranking engine 108 determines (204) attributes associated with feedback reports 114. Application ranking engine 108 generates (206) metrics for feedback reports 114, as described in further detail below. Application ranking engine 108 generates (208) associations among feedback reports 114 and attributes and metrics for feedback reports 114, as described in further detail below. Application ranking engine 108 stores (210) in data repository 106 feedback reports 114 and associated attributes and metrics (e.g., see below Table 1).

Figure 3:
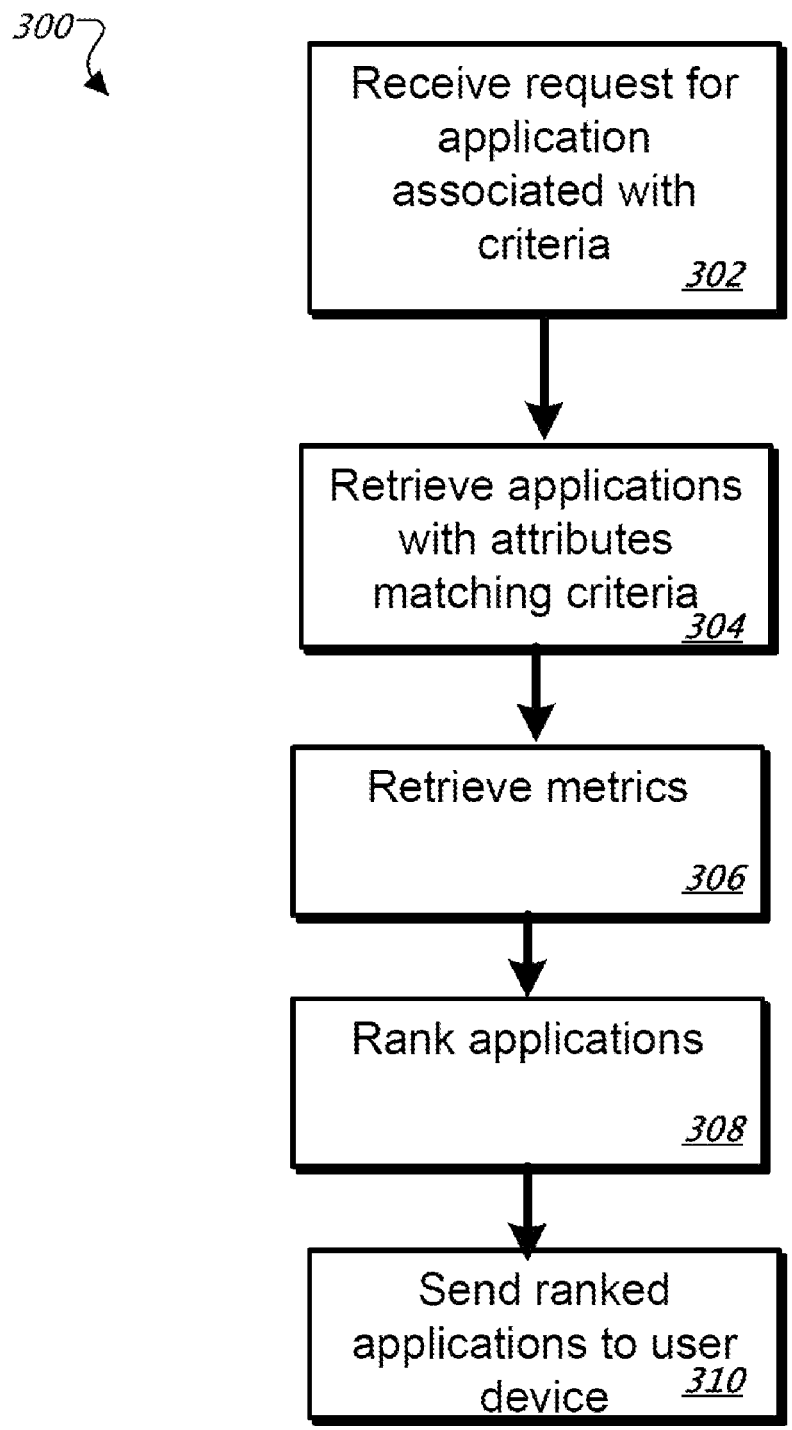
FIG. 3 is a flow diagram of an example process for ranking applications based on feedback reports.

FIG. 3 is a flow diagram of an example process 300 for ranking applications 120a-120n based on feedback reports 114. In operation, application ranking engine 108 receives (302) a request for applications 124. The request for applications 124 includes various criteria specifying attributes for the requested applications. Application ranking engine 108 retrieves (304) from data repository 106 applications associated with attributes matching the criteria specified in request for applications 124, e.g., by comparing the attributes of applications 120a-120n to the criteria included in request for applications 124.

For the applications associated with attributes matching the criteria, application ranking engine 108 also retrieves (306) metrics (e.g., usage metrics, quality metrics, and the like) associated with the applications. Application ranking engine 108 ranks (308) the retrieved applications, e.g., using the metrics associated with the applications. In an example, application ranking engine 108 is configured to send to user device 104 applications associated with quality metrics above the threshold quality metric and/or applications associated with usage metrics above the threshold usage metric, as described in further detail below. Application ranking engine 108 sends (310) the ranked applications (e.g., ranked applications 122a) to user device 104.

Generation of Quality Metrics

Using the contents of feedback report 114, application ranking engine 108 is configured to generate a quality metric for an application associated with feedback report 114. In this example, the application encountered an error on user device 104 in a particular geographic location. In an example, application ranking engine 108 is configured to generate a quality metric in accordance with a pre-defined scale that ranges between a value of one and a value of ten, with a value of ten indicating a higher level of quality and a value of one indicating a lower level of quality.

In this example, application ranking engine 108 is configured to generate a quality metric for the application associated with feedback report 114 based on keywords and/or error codes included in feedback report 114. Application ranking engine 108 is configured to store a list of keywords that are each associated with a quality metric. In this example, one keyword is "failure." The "failure" keyword is associated with a quality metric having a value of one to indicate that an application associated with a feedback report that includes the "failure" keyword is experiencing a lower level of quality relative to other applications. In this example, another keyword is "difficulty." The "difficulty" keyword is associated with a quality metric having a value of five to indicate that an application associated with a feedback report that includes the "difficulty" keyword is experiencing an intermediate level of quality, e.g., relative to an application associated with a "failure" keyword.

Feedback manager 112 may also be configured to generate feedback reports 114 to notify device 102 of an application's increased level of performance in a geographic location and/or of the application's ability to run on user device 104 without encountering errors. In an example, feedback reports 114 may include the keywords "good" or "excellent" to indicate that the application is performing without errors on user device 104. In this example, the "excellent" keyword is associated with a quality metric having a value of ten to indicate that an application associated with the feedback report is experiencing a higher level of quality in a particular geographic location relative to other applications. The "good" keyword is associated with a quality metric having a value of eight to indicate that an application associated with the feedback report is experiencing a stronger level of quality in the particular geographic location, e.g., relative to other applications that are also running in the particular geographic location.

In another example, application ranking engine 108 may be configured to generate a quality metric for an application based on an absence of feedback reports for the application. In this example, if an application does not have any feedback reports associated with it, then application ranking engine 108 determines that there have been no problems with the application and assigns the application a quality metric with a value of ten.

In another example, application ranking engine 108 is configured to detect an error code in feedback report 114. In this example, application ranking engine 108 determines a severity of an error encountered by an application based on a value of the error code included in feedback report 114. Application ranking engine 108 obtains from a developer of the application an explanation of the various error codes associated with the application. For example, the explanation may include a mapping of error codes to information specifying a meaning of the error code.

Using the explanations of the error codes, application ranking engine 108 is configured to generate a quality metric for an error code. In an example, an error code includes a value of "error code 528." In this example, based on the explanation information obtained from the developer of the application, application ranking engine 108 determines that "error code 528" corresponds to a failure of the application. Accordingly, application ranking engine 108 generates a quality metric with a value of one for the application associated with "error code 528." By generating a quality metric with a value of one, application ranking engine 108 assigns the application a quality metric indicative of the lower level of quality of the application in a particular geographic location, e.g., relative to the level of quality of other applications running in the geographic location.

Generation of Usage Metrics

In an example, application ranking engine 108 is also configured to use the contents of feedback reports 114 to generate usage metrics for applications 120a-120n. In this example, an application is associated with a usage metric that is initialized to a value of zero. When application ranking engine 108 receives feedback report 114 for the application, application ranking engine 108 increments the value of the usage metric by a value of one. By incrementing the value of the usage metric each time application ranking engine 108 receives feedback report 114 for the application, the usage metric corresponds to a number of users that are using the application. Additionally, application ranking engine 108 may also generate usage metrics for a time interval, for example, by associating feedback report 114 with a timestamp and incrementing the usage metric for feedback reports 114 associated with timestamps that occur within the time interval, as described in further detail below.

In particular, when application ranking engine 108 receives feedback report 114, application ranking engine 108 determines a name of an application associated with feedback report 114, e.g., based on the contents of feedback report 114. Application ranking engine 108 retrieves the usage metric for the application associated with feedback report 114 and increments the usage metric for the application by a value of one. Each time application ranking engine 108 receives a feedback report for that particular application, application ranking engine 108 continues to increment the usage metric by a value of one.

In another example, application ranking engine 108 also determines usage metrics for a pre-defined time interval. In this example, feedback report 114 includes a timestamp indicative of a time in which the error occurred. Application ranking engine 108 stores, e.g., in data repository 106, the name of the application for which feedback report 114 was received and the timestamp associated with feedback report 114. Application ranking engine 108 determines a number of feedback reports received within the pre-defined time interval for a particular application (e.g., a usage metric for the application), as described in further detail below.

In particular, when feedback ranking engine 108 receives a request for applications in a particular geographic location, feedback ranking engine 108 determines a time at which the request was received by device 102 ("request time"). Application ranking engine 108 determines a time interval surrounding the request time, e.g., five minutes before and after the request time, twenty minutes before and after the request time, and so forth. Application ranking engine 108 may determine the time interval surrounding the request time based on a user's preferences regarding the time interval and/or based on a pre-defined time interval stored in data repository 106.

Application ranking engine 108 queries data repository 106 for feedback reports received within the time interval and associated with the particular geographic location. In response, application ranking engine 108 receives information indicative of feedback reports that have been received for various applications within the time interval. Application ranking engine 108 generates a usage metric for a particular application by tallying the number of feedback reports that were received within the time interval and are associated with the particular geographic location.

In an example, application ranking engine 108 receives feedback reports 114 for numerous, different applications that are being used in a particular geographic location. In this example, feedback reports 114 are each associated with timestamps occurring within the pre-defined time interval. Application ranking engine 108 generates usage metrics for each of the applications and determines an application associated with a largest usage metric in relation to the usage metrics of the other applications. In this example, application ranking engine 108 sends to user device 104 information specifying a name of the application that is most popular in the particular geographic location, e.g., associated with a largest usage metric for the geographic location relative to the other usage metrics of the other applications.

Association of a Geographic Location Attribute with a Feedback Report

The feedback report 114 includes geographic location attributes that specify a geographic location of user device 104 at a time when feedback report 114 was generated by feedback manager 112. Application ranking engine 108 associates the geographic location attribute with feedback report 114 and stores the geographic location attribute in data repository 106. The geographic location attribute is also associated with usage metrics and quality metrics for feedback report 114. In this example, application ranking engine 108 generates the association through use of a pointer. Generally, a pointer includes a data structure that references two or more items of data (e.g., a feedback report, a geographic location attribute for the feedback report, metrics for the feedback report, and other attributes for the feedback report).

By associating the geographic location attribute with feedback report 114, usage metrics, and/or quality metrics, application ranking engine 108 enables a user of user device 104 to search for applications that perform well and/or are popular in a particular geographic location.

In an example, request for applications 124 includes a request for applications that perform well in a particular geographic location. In this example, application ranking engine 108 is configured to search data repository 106 for applications that are (i) associated with a geographic location attribute matching the particular geographic location included in request 124, and (ii) associated with quality metrics above the threshold quality metric. Application ranking engine 108 determines applications satisfying these criteria, ranks the applications, and sends the ranked applications to user device 104.

Example Entries in Data Repository 106

Application ranking engine 108 is configured to receive feedback reports 114, to determine geographic location attributes for feedback reports 114, and to generate quality and usage metrics for feedback reports 114. Data repository 106 is configured to store feedback reports 114, and associated metrics and attributes (e.g., that are associated with feedback reports 114 via pointers), as illustrated in the below Table 1.

TABLE 1

| Application Name | Quality Metric | Usage Metric | Geographic Location Attribute |
|---|---|---|---|
| Application A | 10 | 2 | San Francisco, CA |
| Application A | 9 | 2 | San Francisco, CA |
| Application B | 5 | 1 | San Francisco, CA |
| Application C | 1 | 1 | San Francisco, CA |

As illustrated in the above Table 1, application ranking engine 108 receives feedback reports for three different applications, namely, Applications A, B and C, that are running on various user devices in San Francisco, Calif. In particular, application ranking engine 108 receives two feedback reports for Application A, for example, from two different user devices running Application A in San Francisco, Calif. Application ranking engine 108 receives one feedback report for Application B from a user device in San Francisco, Calif. Application ranking engine 108 also receives a feedback report for Application C from another user device in San Francisco, Calif.

Application ranking engine 108 determines that the user devices sending the feedback reports for Applications A, B, and C are associated with a geographic location of San Francisco, Calif. Accordingly, application ranking engine 108 sets the value of the geographic location attributes for Applications A, B and C to each equal "San Francisco, Calif.," as indicated in the above Table 1. Additionally, application ranking engine 108 generates quality metrics and usage metrics for Applications A, B and C.

For example, Application A is associated with quality metrics having values of ten and nine to indicate a high level of quality for Application A in San Francisco, Calif. In this example, the feedback reports for Application A may have included the keywords of "good" and/or "excellent" to indicate that Application A performed well in San Francisco.

Still referring to Table 1, Application B is associated with a quality metric having a value of five, indicating a moderate level of quality for Application B in San Francisco, Calif. In this example, the feedback report for Application B may have included the keyword "difficulty" to indicate that Application B experienced a moderate level of quality in San Francisco. Application C is associated with a quality metric having a value of one to indicate a low level of quality for Application C in San Francisco, Calif. In this example, the feedback report for Application C may have included the keyword "failure" to indicate that Application C experienced a low level of quality in San Francisco.

Additionally, because application ranking engine 108 has received two feedback reports for Application A, application ranking engine 108 determines that at least two user devices are running Application A in San Francisco, Calif. Accordingly, Application A is associated with a usage metric having a value of two. Because application ranking engine 108 has only received one feedback report for each of Applications B and C, the usage metrics for Applications B and C are each associated with values of one.

In an example, request for applications 124 includes a request for applications that are popular in San Francisco, Calif. In this example, application ranking engine 108 queries data repository 106 for a list of applications associated with usage metrics in San Francisco, Calif. In this example, data repository 106 is configured to store the information included in the above Table 1. Accordingly, data repository 106 returns to application ranking engine 108 information specifying the usage metrics for Applications A, B and C.

In this example, application ranking engine 108 is configured to execute a ranking process to rank Applications A, B and C, based on the value of the usage metrics, including, e.g., in an order corresponding to applications associated with the lower usage metrics being ranked beneath applications associated with higher usage metrics. In another example, application ranking engine 108 may also execute a ranking process that ranks applications based on a value of quality metrics, including, e.g., applications with higher quality metrics are ranked above applications with lower quality metrics, and so forth.

In still another example, application ranking engine 108 is configured to rank applications using a ranking score that is generated from both the usage metrics and the quality metrics, e.g., based on a linear weighted regression, in which various weighted values are applied to the quality metrics and/or to the usage metrics. Generally, a ranking score is a value specifying an importance of a data item in relation to other data items. In this example, application ranking engine 108 is configured to rank applications in a high-to-low ordering, in which applications associated with higher scores are ranked above applications associated with lower scores.

In an example, application ranking engine 108 executes a ranking process that weights the quality metric twice as heavily as the usage metric is weighted. In this example, the ranking process adds the usage metric to twice a value of the quality metric. By executing the foregoing ranking process, application ranking engine 108 generates ranking scores for Applications A, B and C as follows. Application A is associated with ranking scores having values twenty-two and twenty. Application B is associated with a ranking score having a value of eleven. Application C is associated with a ranking score having a value of three.

In this example, application ranking engine 108 is configured to rank Applications A, B and C in a high-to-low ordering based on the ranking scores. Accordingly, application ranking engine 108 ranks Application A first in the order, Application B second in the order and Application C last in the order. As illustrated in FIG. 1A, application ranking engine 108 sends user device 104 ranked applications 122a, which in this example, includes Application A ranked above Application B and Application B ranked above Application C.

In still another example, application ranking engine 108 may be configured to include in ranked applications 122a applications that are associated with a metric above a threshold metric, e.g., for a particular geographic location. In an example, request for applications 124 includes a request for applications associated with a high quality level in San Francisco, Calif. In this example, application ranking engine 108 includes a threshold quality metric associated with a value of five. Because the threshold quality metric has a value of five, application ranking engine 108 is configured to return to user device 104 a ranked list of applications associated with quality metrics having a value of five or greater.

In this example and referring back to Table 1, application ranking engine 108 returns Applications A and B to user device 104, because Applications A and B are each associated with quality metrics having values of five or greater. Application ranking engine 108 does not return Application C to user device 104, because Application C is associated with a quality metric that has a value of less than five.

Using similar techniques, application ranking engine 108 may be configured to return to user device 104 ranked applications associated with usage metrics above a threshold usage metric. Additionally, using similar techniques, application ranking engine 108 may also be configured to return to user device 104 ranked applications associated with ranking scores above a threshold ranking score. Generally, a threshold ranking score includes information specifying a pre-defined ranking score to be obtained by an application for the system to assess the application as having a particular characteristic, e.g., a particular performance level, a particular popularity level, and so forth.

Device 102 is configured to receive feedback reports 114 for applications running on computing devices and to generate metrics indicative of a performance of the applications associated with feedback reports 114. Device 102 is also configured to receive request for applications 124. In response to request for applications 124, device 102 is configured to determine applications that are relevant to the request and to rank the relevant applications using the generated metrics.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, or tactile feedback). Input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. Other steps may be provided, or steps may be eliminated, from the described flows, and other components may be added to, or removed from, the described systems.

A number of implementations have been described. Nevertheless, it will be understood that various modifications may be made without departing from the spirit and scope of the processes and techniques described herein. Accordingly, other implementations not specifically described herein are also within the scope of the following claims.

What is claimed is:

1. A computer-implemented method comprising:
   receiving, from a computing device, a first feedback report related to a first application configured to run on the computing device, the first feedback report comprising information relating to an error that occurred during execution of the first application, and a first geographic location of the computing device at a time when the first application encountered the error;
   generating by a processor, based on the first feedback report, one or more metrics indicative of a performance of the first application in the first geographic location;
   retrieving information indicative of one or more other applications associated with the one or more metrics, the information indicative of a performance of each of the one or more other applications in the first geographic location;
   ranking, by the processor, the one or more other applications in accordance with the information indicative of the performance of each of the one or more other applications in the first geographic location;
   retrieving one or more second feedback reports, the one or more second feedback reports comprising one or more attributes of the one or more other applications;
   receiving, at a request time, a request associated with one or more criteria, the request received from the computing device located at a second geographic location;
   determining, based on the one or more second feedback reports, the one or more other applications associated with matching attributes of the one or more attributes, wherein the matching attributes match at least one of the one or more criteria;
   ranking the one or more other applications associated with the matching attributes, where the ranking is based on (i) a relevance of each of the one or more other applications associated with the matching attributes to the one or more criteria, and (ii) the information indicative of the performance, during a time interval surrounding the request time, of each of the one or more other applications associated with the matching attributes in the second geographic location;
   sending a list of the ranked one or more other applications associated with the matching attributes to the computing device;
   receiving, from the computing device, a selection from among the ranked one or more other applications associated with the matching attributes; and
   sending an application associated with the selection to the computing device.

2. The computer-implemented method of claim 1, further comprising:
   parsing the first feedback report to determine information indicative of a name of the first application, the information indicative of the error with the first application, and the information indicative of the first geographic location; and
   storing in a database the information indicative of the name of the first application, the information indicative of the error with the first application, and the information indicative of the first geographic location, with one or more pointers linking each of the information indicative of the name of the first application, the information indicative of the error, and the information indicative of the first geographic location.

3. The computer-implemented method of claim 1, further comprising: generating a graphical user interface that when rendered on a display device renders a visual representation of the ranked applications associated with the matching attributes.

4. The computer-implemented method of claim 1, wherein the first feedback report is (i) generated by a feedback application configured to run on the computing device, and (ii) periodically received from the computing device.

5. A system comprising:
   one or more processing devices; and
   one or more machine-readable media configured to store instructions that are executable by the one or more processing devices to perform operations comprising:
      receiving, from a computing device, a first feedback report related to a first application configured to run on the computing device, the first feedback report comprising information relating to an error that occurred during execution of the first application, and a first geographic location of the computing device at a time when the first application encountered the error;
      generating, based on the first feedback report, one or more metrics indicative of a performance of the first application in the first geographic location;
      retrieving information indicative of one or more other applications associated with the one or more metrics, the information indicative of a performance of each of the one or more other applications in the first geographic location;
      ranking the one or more other applications in accordance with the information indicative of the performance of each of the one or more other applications in the first geographic location;
      retrieving one or more second feedback reports, the one or more second feedback reports comprising one or more attributes of the one or more other applications;
      receiving, at a request time, a request associated with one or more criteria, the request received from the computing device located at a second geographic location;
      determining, based on the one or more second feedback reports, the one or more other applications associated with matching attributes of the one or more attributes, where the matching attributes match at least one of the one or more criteria;
      ranking the one or more other applications associated with the matching attributes, where the ranking is based on (i) a relevance of each of the one or more other applications associated with the matching attributes to the one or more criteria, and (ii) the information indicative of the performance, during a time interval surrounding the request time, of each of the one or more other applications associated with the matching attributes in the second geographic location;

sending a list of the ranked one or more other applications associated with the matching attributes to the computing device;

receiving, from the computing device, a selection from among the ranked one or more other applications associated with the matching attributes; and sending an application associated with the selection to the computing device.

6. The system of claim 5, wherein the operations further comprise:

parsing the first feedback report to determine information indicative of a name of the first application, the information indicative of the error with the first application, and the information indicative of the first geographic location; and storing in a database the information indicative of the name of the first application, the information indicative of the error with the first application, and the information indicative of the first geographic location, with one or more pointers linking each of the information indicative of the name of the first application, the information indicative of the error, and the information indicative of the first geographic location.

7. The system of claim 5, wherein the operations further comprise: generating a graphical user interface that when rendered on a display device renders a visual representation of the ranked applications associated with the matching attributes.

8. The system of claim 5, wherein the first feedback report is (i) generated by a feedback application configured to run on the computing device, and (ii) periodically received from the computing device.

9. One or more processing devices comprising a machine-readable medium configured to store instructions that are executable by the one or more processing devices to perform operations comprising:

receiving, from a computing device, a first feedback report related to a first application configured to run on the computing device, the first feedback report comprising information relating to an error that occurred during execution of the first application, and a first geographic location of the computing device at a time when the first application encountered the error;

generating, based on the first feedback report, one or more metrics indicative of a performance of the first application in the first geographic location;

retrieving information indicative of one or more other applications associated with the one or more metrics, the information indicative of a performance of each of the one or more other applications in the first geographic location;

ranking the one or more other applications in accordance with the information indicative of the performance of each of the one or more other applications in the first geographic location;

retrieving one or more second feedback reports, the one or more second feedback reports comprising one or more attributes of the one or more other applications;

receiving, at a request time, a request associated with one or more criteria, the request received from the computing device located at a second geographic location;

determining, based on the one or more second feedback reports, the one or more other applications associated with matching attributes of the one or more attributes, where the matching attributes match at least one of the one or more criteria;

ranking the one or more other applications associated with the matching attributes, where the ranking is based on (i) a relevance of each of the one or more other applications associated with the matching attributes to the one or more criteria, and (ii) the information indicative of the performance, during a time interval surrounding the request time, of each of the one or more other applications associated with the matching attributes in the second geographic location;

sending a list of the ranked one or more other applications associated with the matching attributes to the computing device;

receiving, from the computing device, a selection from among the ranked one or more other applications associated with the matching attributes; and sending an application associated with the selection to the computing device.

10. The one or more processing devices comprising a machine-readable medium of claim 9, wherein the operations further comprise:

parsing the first feedback report to determine information indicative of a name of the first application, the information indicative of the error with the first application, and the information indicative of the first geographic location; and storing in a database the information indicative of the name of the first application, the information indicative of the error with the first application, and the information indicative of the first geographic location, with one or more pointers linking each of the information indicative of the name of the first application, the information indicative of the error, and the information indicative of the first geographic location.

11. The one or more processing devices comprising a machine-readable medium of claim 9, wherein the operations further comprise: generating a graphical user interface that when rendered on a display device renders a visual representation of the ranked applications associated with the matching attributes.

12. The one or more processing devices comprising a machine-readable medium of claim 9, wherein the first feedback report is (i) generated by a feedback application configured to run on the computing device, and (ii) periodically received from the computing device.

13. A computer-implemented method comprising:

receiving, from a computing device, a feedback report related to a first application configured to run on the computing device, the feedback report comprising information relating to an error that occurred during execution of the first application, and a first geographic location of the computing device at a time when the first application encountered the error;

generating by a processor, based on the feedback report, one or more metrics indicative of a performance of the first application in the first geographic location;

receiving, at a request time, a request for an application associated with one or more criteria, the request received from a computing device located at a second location;

retrieving information indicative of one or more other applications associated with the one or more criteria, the information indicative of a performance, during a time interval surrounding the request time, of each of the one or more other applications in the second geographic location;

ranking, by the processor, the one or more other applications based on (i) a relevance of each of the one or more other applications to the one or more criteria, and (ii) the information indicative of the performance during the time interval surrounding the request time of each of the one or more other applications in the second geographic location;

sending a list of the ranked one or more other applications to the computing device;

receiving, from the computing device, a selection of at least one of the ranked one or more other applications; and sending an application associated with the selection to the computing device.

14. The method of claim 13, further comprising ranking, by the processor, the first application among the one or more other applications based on (i) a relevance of the first application to the one or more criteria, and (ii) the one or more metrics indicative of the performance of the first application in the first geographic location.

* * * * *